Dec. 16, 1969   PAUL-ALBERT KUNZ   3,484,629
RECIPROCATING MOTOR STRUCTURE
Filed March 1, 1968
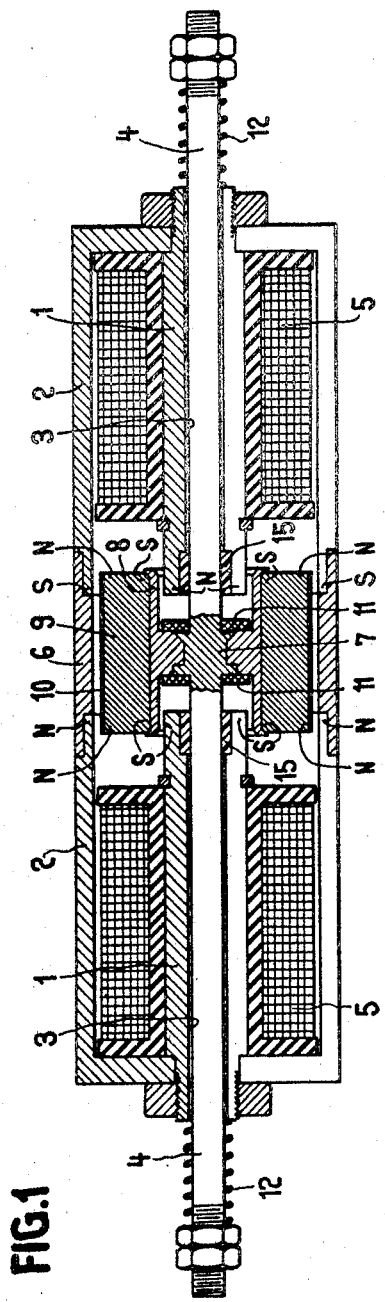
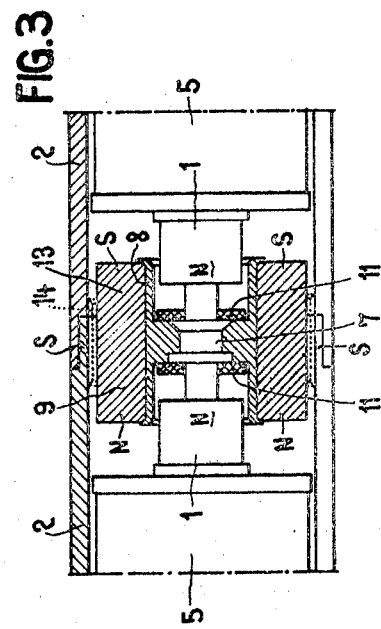
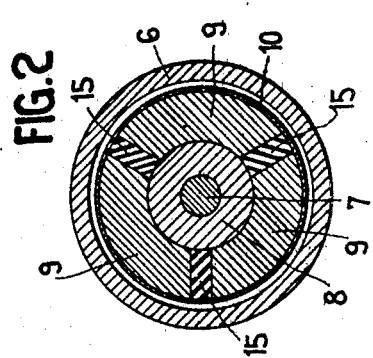
PAUL-ALBERT KUNZ,
INVENTOR

United States Patent Office 3,484,629
Patented Dec. 16, 1969

3,484,629
RECIPROCATING MOTOR STRUCTURE
Paul-Albert Kunz, Bole, Switzerland, assignor to Emissa
S.A., Le Locle, Neuchatel, Switzerland
Filed Mar. 1, 1968, Ser. No. 709,718
Int. Cl. H02k *33/06*
U.S. Cl. 310—15                                                5 Claims

ABSTRACT OF THE DISCLOSURE

A reciprocating motor, particularly for an electric tooth brush, razor or the like, wherein an annular magnetized armature is displaceably disposed within reach of an air gap or air gaps formed at the open end of one or two pots of ferromagnetic material, alternating-current exciting coils being disposed in the pot or pots.

---

This invention relates to a reciprocating motor, particularly for electric tooth brushes, razors and the like, comprising a magnetized armature adapted to reciprocate when driven by the magnetic field of a coil energized by alternating current.

Prior motors of this type for tooth brushes have a driving rod adapted to be reciprocated by said motor in a direction transversely to its longitudinal extension. However, it was found that reciprocation of the tooth brush in the axial direction of the driving rod has many advantages. This invention aims in providing a reciprocating motor of simple and highly efficient design and making optimum use of the magnet or magnets forming the armature or amatures driven by the alternating magnetic field. The motor according to this invention broadly comprises at least one coil adapted to be energized by alternating current and at least one magnetized armature adapted to reciprocate when driven by the magnetic field of said coil, at least one pot of soft iron forming an air gap at its open end said coil being accommodated in said pot and said magnetized armature having an annular shape and being located in said air gap. With this arrangement the magnetic flux set up in the air gap is practically fully utilized for driving the magnetized armature of annular form engaging into the air gap or air gaps, for producing a reciprocating displacement in axial direction of the armature and of the tooth brush respectively coupled thereto.

Two coaxial pots are preferably provided, said magnetized armature having poles located in the air gaps of both pots. In this preferred embodiment the magnetized armature is particularly well utilized. In order to obtain a high efficiency of the motor, a radial magnetization of the armature is preferably. However, it is well known in the art that efficient radial magnetization of an annular armature is relatively difficult to obtain. In order to avoid this difficulty, said armature of annular form may be composed from a number of radially magnetized segments this allowing to obtain maximum coercive power and magnetization of such magnets.

The accompany drawing illustrates, by way of example, an embodiment and a modified form of the motor according to this invention.

FIG. 1 is an axial section of the embodiment,
FIG. 2 is a cross section of the embodiment and
FIG. 3 is an axial section of a modified portion of the motor.

The motor illustrated in FIGS. 1 and 2 has two pots made of soft iron and having each a core 1 and a mantle 2. The cores 1 have an axial bore 3. By means of two nylon bearings 15 a transmission rod 4 is mounted in the bores 3 of cores 1 in a manner allowing axial displacement of the rod in the bores 3. Coils 5 are accommodated in the pots 1, 2. The mantles 2 of the pots of soft iron are interconnected by means of a ring 6 of brass or other suitable non-magnetizable material. The cores 1 and the mantles 2 have a slit in order to avoid Foucault-currents.

A cylinder 8 of brass or other non-magnetizable material is fixed on a collar 7 of the transmission rod 4. The cylinder 8 is a carrier for a number of segment-shaped magnets 9. These segments assembled in an outer mantle 10 of brass or other non-magnetizable material form an armature of substantially annular form. Spacing plates 15 are provided between adjacent magnets 9. In this embodiment of the motor three magnets 9 are provided, but it is obvious that any other suitable number of magnets may be used. The magnets 9 are radially magnetized as indicated in FIG. 1 by the letters N and S.

Rubber washers 11 are disposed on opposite faces of collar 7. The transmission rod 4 and the parts fixed thereon, particularly the magnets 9 are maintained in the symmetrical rest position shown in FIG. 1 by springs 12. A tooth brush not shown in the drawing may be fixed to one free end of the transmission rod 4.

As mentioned above, springs 12 tend to maintain the magnets 9 forming the armature in a symmetric rest position between pots 1, 2. When the coils 5 are energized by alternating current, alternating magnetic fields are set up between the inner ends of cores 1 and mantles 2. For one direction of current flow in the coils, magnetic south poles and north poles are produced at the ends of cores 1 and mantles 2 respectively as indicated in FIG. 1. With these polarities it is seen that the magnets 9 are pulled towards the right-hand pot and are pushed away from the left-hand pot, the armature and transmission rod being thus shifted to the right. When the direction of current flow in coils 5 is changed, the armature is shifted to the left. The armature and transmission rod 4 are thus displaced in a reciprocating movement at the frequency of the alternating current. The rubber washers 11 avoid direct impacts of the faces of collar 7 against the faces of cores 1.

The modification shown in FIG. 3 distinguishes from the embodiment shown in FIG. 1 only by replacement of the radially magnetized magnets 9 by a single annular magnet 13 magnetized in axial direction and by the fact that the mantles 2 of the soft-iron pots are directly interconnected.

The coils are so connected that the same magnetic polarity appears at the inner ends of the cores 1. By these magnetic poles the magnet 13 is alternatively shifted to the right and to the left. The efficiency of the motor may be improved when salient poles are formed by inserting a ring 14 of soft iron as indicated in dotted lines in FIG. 3.

What I claim is:
1. A reciprocating electric motor, particularly for electric tooth-brushes, comprising a pair of coaxially disposed pots of soft iron having each an outer cylindrical mantle and an inner tubular core, a coil adapted to be energized by alternating current in each of said pots, said mantle and said core of each pot freely extending in axial direction from said coils and forming a radially extending air gap between their freely extending portions, an annular armature fixed to an axially displaceable drivng rod with its central portion and extending into said air gaps with its axially extending end portions.

2. A reciprocating electric motor, particularly for electric tooth-brushes, comprising a pair of coaxially disposed pots of soft iron having each an outer cylindrical mantle and an inner tubular core, said pots being axially spaced from each other to form substantially independent magnetic systems, a coil adapted to be energized by alternating current in each of said pots, said mantle and said core of each pot freely extending in axial direction from said coils and forming a radially extending air gap between their freely extending portions, an annular armature magnetized in radial direction and engaging with its free ends into said air gaps formed between the core and mantle of each pot.

3. A motor according to claim 2, comprising an armature made of a number of segments disposed in annular arrangement.

4. A motor according to claim 2, wherein said pots are interconnected by means of non-magnetizable parts, the poles of such pots being thus spaced from each other.

5. A motor according to claim 3, wherein said segments are mounted in a metal sheet mantle of non-magnetizable material.

References Cited

UNITED STATES PATENTS

| | | | |
|---|---|---|---|
| 2,145,711 | 1/1939 | Critchfield et al. | 310—29 |
| 2,568,757 | 9/1951 | Mesh | 310—18 |
| 3,293,515 | 12/1966 | Klemm | 310—29 X |
| 3,315,147 | 4/1967 | Cook et al. | 310—15 X |

MILTON O. HIRSHFIELD, Primary Examiner

D. F. DUGGAN, Assistant Examiner

U.S. Cl. X.R.

310—30, 35